United States Patent [19]

Kirwan, Jr. et al.

[11] Patent Number: 4,548,714
[45] Date of Patent: Oct. 22, 1985

[54] SEMIPERMEABLE MEMBRANE CARTRIDGE FOR USE WITH A PRESSURE CONTAINER

[75] Inventors: John R. Kirwan, Jr., Chula Vista; Donald T. Bray, Escondido, both of Calif.

[73] Assignee: Desalination Systems, Inc., Escondido, Calif.

[21] Appl. No.: 540,489

[22] Filed: Oct. 11, 1983

[51] Int. Cl.$^4$ .............................................. B01D 31/00
[52] U.S. Cl. .................. 210/232; 210/433.2; 210/451
[58] Field of Search .............. 210/450, 321.1, 321.2, 210/433.2, 637, 652, 232, 451

[56] References Cited

U.S. PATENT DOCUMENTS 3,417,870 3/1965 Bray ....................................... 210/321
4,301,013 11/1981 Setti et al. ............................. 210/637
4,387,024 6/1983 Kurihara et al. ..................... 210/490

Primary Examiner—Frank Spear
Attorney, Agent, or Firm—Fitch, Even, Tabin & Flannery

[57] ABSTRACT

An improvement in a membrane cartridge for insertion into a pressure-resistant container and having a central passageway holding a permeate collection tube. A cartridge is formed, at least in part, by a spiral winding of a laminate leaf comprising semipermeable membrane sheet material, permeate transfer sheet material, and porous grid sheet material. An extension on the leaf of the porous grid material is of sufficient length to encompass the circumference of the cartridge when the cartridge is positioned inside the container. The cartridge may have an outer wrapping of water-soluble sheet material.

2 Claims, 9 Drawing Figures

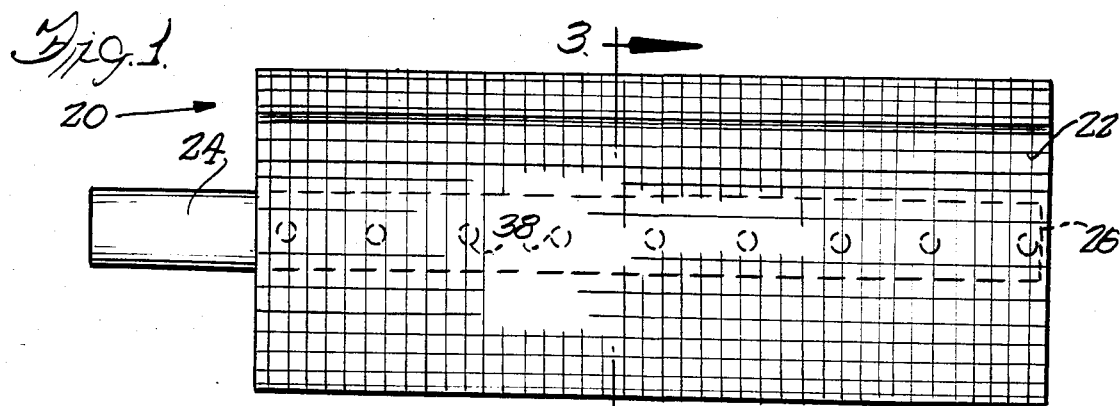
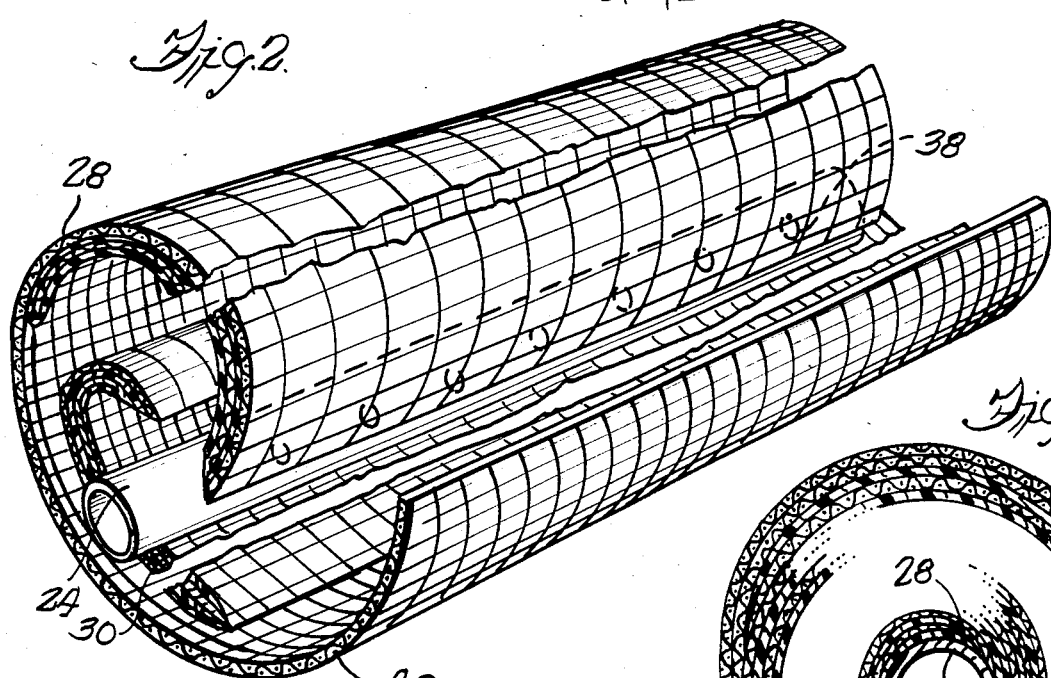
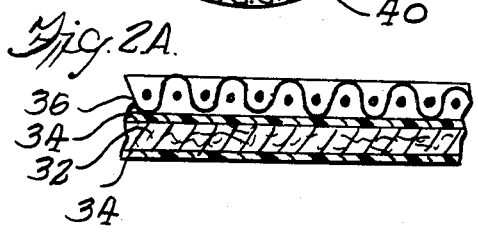
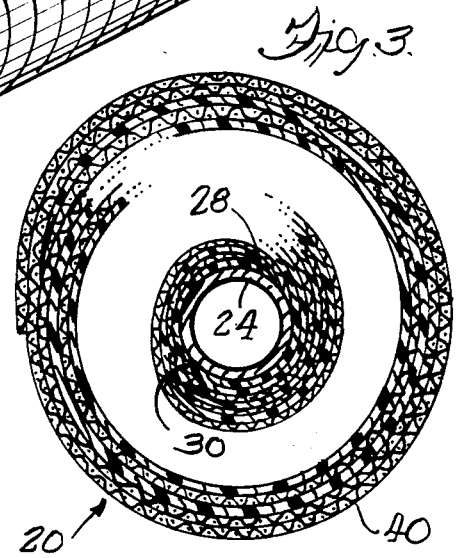
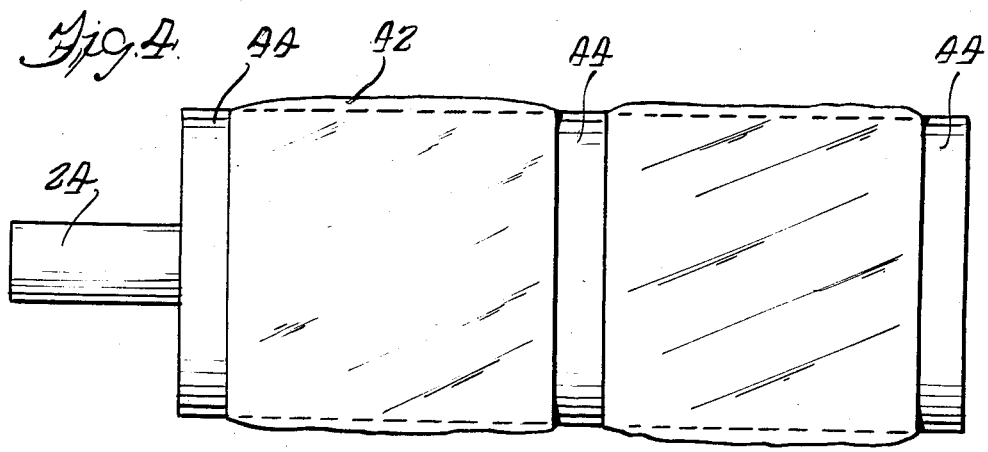

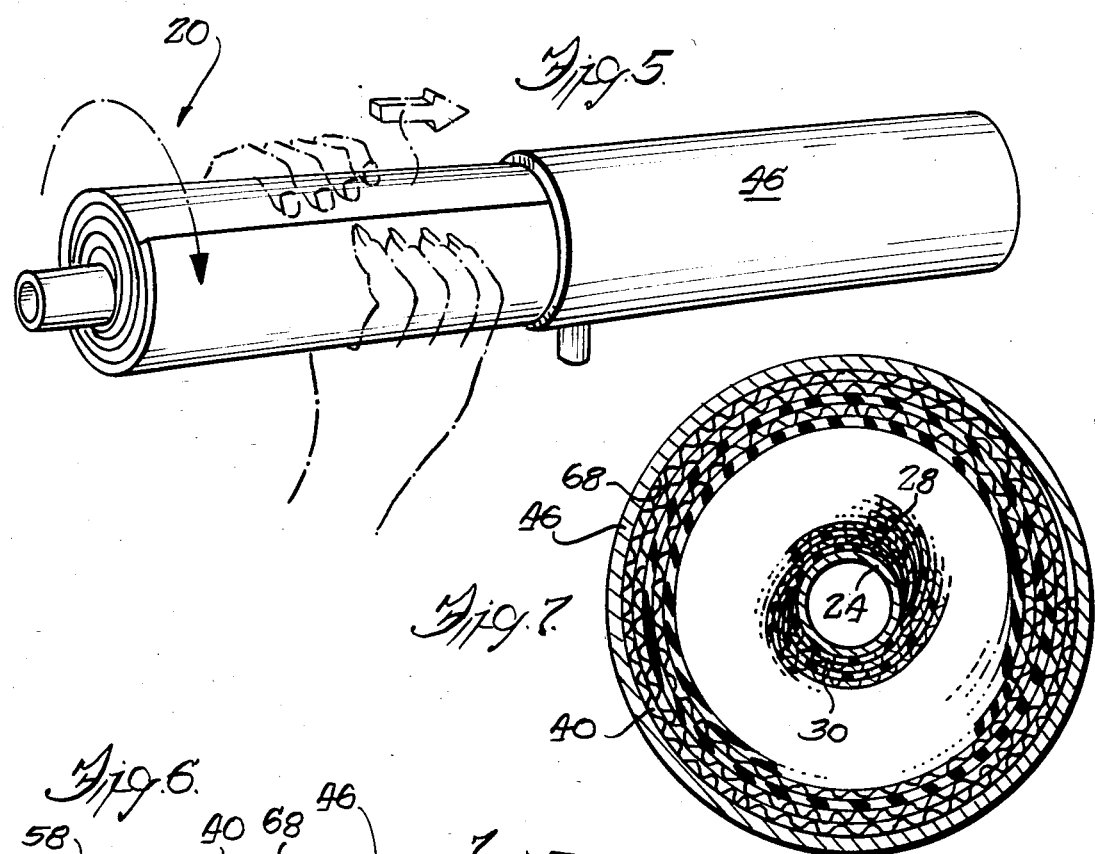
Fig. 5
Fig. 7
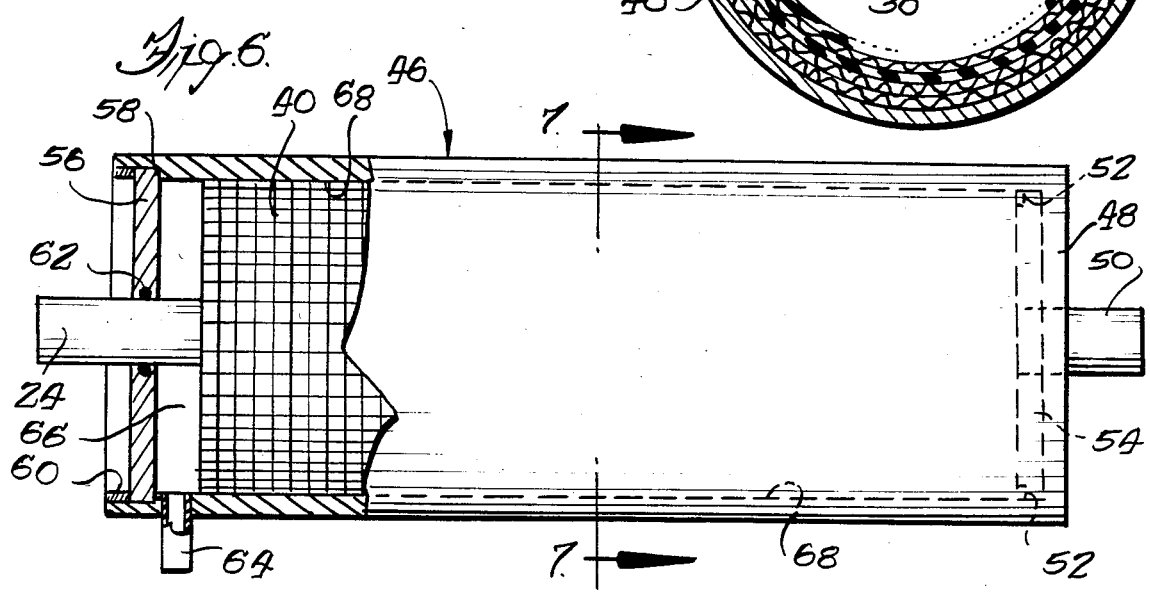
Fig. 6
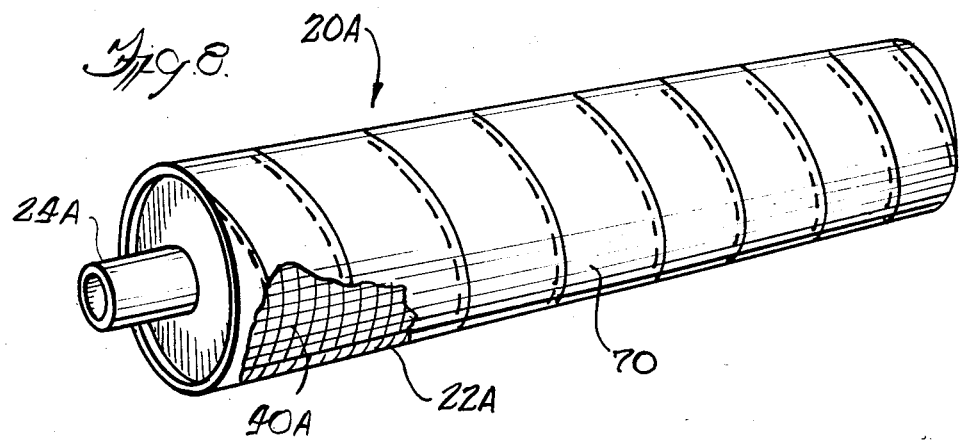
Fig. 8 ize: 14px;">
SEMIPERMEABLE MEMBRANE CARTRIDGE FOR USE WITH A PRESSURE CONTAINER

BACKGROUND OF THE INVENTION

1. The Field of the Invention

This invention relates to apparatus for treatment of a liquid by passage through a semipermeable membrane under pressure, as exemplified by processes such as ultrafiltration and reverse osmosis.

2. The Prior Art

The prior art has developed several types of membrane assemblies employed in apparatus for separation of fluid or liquid constituents. One of the most widely employed is the so-called spiral wound membrane cartridge, such as particularly described in U.S. Pat. Nos. 3,542,203 and 3,417,870. A spiral wound membrane cartridge comprises one or more laminate leaf assemblies of semipermeable membrane sheet, backing sheet and porous grid material. These leaf assemblies are each arranged so that the feed liquid is carried over the membrane surface by the porous grid material while permeate is carried through the backing sheet to a central permeate collection tube. After the leaves are arranged and spirally wound around the central permeate collection tube, a layer of adhesive-carrying, impervious plastic tape is tightly wound around the entire body of the cartridge to hold the wound leaves firmly in place. Before insertion into a pressure-resistant container, seals, most often of the so-called "chevron" type, are fitted onto the outer surface of the cartridge to prevent feed liquid from passing between the cartridge exterior and the pressure-resistant container's inner wall so as to bypass the working passages interior of the cartridge.

The arrangement described above has functioned reasonably well over a number of years. However, larger plants are now being built and operated, and the use of membrane cartridges in a much wider field of use has disclosed several disadvantages. Spacing of the outer circumference of the cartridge from the inner wall of the pressure vessel, in order to accommodate chevron seals, has resulted in a small, but measurable, loss of working volume. This loss has become more significant with employment of larger numbers of larger diameter cartridges. Additionally, dead space between the membrane cartridge outer surface and the pressure-resistant vessel inner wall traps solution which is difficult to remove and clean. This is a serious disadvantage when such cartridges are employed in food product treatment, such as ultrafiltration of whey. Such processes may require relatively frequent cleaning and bactericide treatment to prevent growth of bacteria in such stagnant areas. The chevron seals, while efficient during normal operation, have disadvantages during cleaning. They are essentially one-way devices and prevent the effective use of reverse flow of feed liquid, or backwashing, which is most effective for in-place cleaning. If reverse flow is attempted when chevron seals are employed, they collapse and allow free passage of an inordinate amount of wash liquid around the outside of the cartridge where it is of little consequence. Additionally, the chevron seals themselves, in a large plant, represent an appreciable original and replacement expense. The chevron seal arrangement makes necessary somewhat larger diameter pressure-resistant containers than are required for accommodation of just the cartridges themselves and represent an additional extra construction expense which may be substantial because pressure-resistant containers are generally fabricated of strong and fairly expensive materials.

Recently available commercial membrane cartridge assemblies obviate the need for such seals, permit the use of smaller diameter pressure-resistant containers, and do not create dead space making complete cleaning readily achievable. In such cartridges, the entire circumference of the cartridge is encompassed by the porous grid sheet material and, when installed, this material is in a close, at least partial sealing relationship with the interior surface of the container. In one cartridge assembly, after spiral winding of the membrane, a separate sleeve or sock formed of the porous grid material is slid over the membrane in a snug fit and the assembly is slid into the container. In order for the sock of single-layer porous grid material to fit over the membrane, the sock is softened by placing it in hot water just prior to its receiving the spiral membrane. It will be appreciated that precise sizing of the cartridge assembly is important because if it has too large a diameter, it will be difficult to insert into the container. On the other hand, too small a diameter will result in a loose fit so that there will be no sealing relationship between the sock and the interior surface of the container. For a more complete description of the structure and operation of such cartridge assembly, reference may be made to U.S. Pat. No. 4,301,013.

In another membrane cartridge construction, the membrane is formed by winding two or more leaves with each leaf having a short extension of the porous grid sheet material, with the combined lengths of the extensions being slightly greater than the circumference of the cartridge so that after winding the cartridge is encompassed by the porous grid material. This cartridge is inserted in the container by pushing it in longitudinally while rotating it in a leaf winding direction. Upon release of the cartridge, due to the tendency of the cartridge to unwind, the cartridge will expand slightly placing the outer layer of the porous grid material in intimate sealing contact with the inner surface of the container. Care must be taken in the winding of the leaves because if there is relative slipping, the extensions could overlap with the result that a portion of the circumference of the cartridge may not be encompassed by the porous grid material while other portions have a double thickness of it. Field winding of this cartridge requires care and is time consuming because each leaf must be carefully trimmed to have an extension of proper length. Additionally, the wound cartridge has multiple free ends. In operation, the feed flow could force these free ends downstream, disturbing the flow patterns and causing difficulty in cartridge removal and reinsertion. In an extreme situation, the disruption of flow patterns could cause the membrane surface to enter into contact with the pressure vessel wall thus making it difficult to clean dead or stagnate areas.

SUMMARY OF THE INVENTION

Among the several objects of the present invention may be noted the provision of an improved membrane cartridge which precludes the need for a separate outer wrap; the provision of such cartridge which insures that the entire circumference of the cartridge is covered by the porous grid material to prevent the membrane material from contacting the container wall; the provision of such cartridge which firmly engages the container inner wall and has only a single free end; and the provision of such cartridge which makes efficient use of material, is easy to wind, insert and remove from its container, and has long service life while being simple and economical to manufacture.

Briefly, the present invention concerns an improvement in a spirally wound membrane cartridge formed by the winding of a laminate leaf comprising a semipermeable membrane sheet material, a permeate transfer sheet material, and a porous grid sheet material. This improvement is an extension on the leaf of the porous grid material which is of sufficient length to encompass the circumference of the cartridge. Thus the cartridge does not require the installation of a separate outer sleeve of a porous grid material and the cartridge has a single free end.

BRIEF DESCRIPTION OF THE DRAWINGS

In the drawings:

FIG. 1 is a side view of a spiral wound membrane cartridge embodying various features of the invention;

FIG. 2 is a perspective view of the membrane cartridge of FIG. 1 with its leaf elements arranged for spiral wounding;

FIG. 2A is a fragmentary view, enlarged in size, of a leaf element shown in FIG. 2;

FIG. 3 is a cross-section of the membrane cartridge of FIG. 1 taken along line 3—3 of FIG. 1;

FIG. 4 is a side view of the membrane cartridge of FIG. 1 plus its temporary protective cover;

FIG. 5 is a perspective view reduced in size of the membrane cartridge of FIG. 4, with its temporary protective cover removed, being inserted into a pressure-resistant container;

FIG. 6 is a side view, partly broken away, of the combination of the membrane cartridge and the pressure-resistant container of FIG. 5 in working relationship;

FIG. 7 is a cross-section of the membrane cartridge and pressure-resistant container combination of FIG. 6 taken generally along the line 7—7; and FIG. 8 is a perspective view, partly broken away of an alternative embodiment of the invention in which a temporary, liquid-degradable wrapping is employed.

Corresponding reference characters indicate corresponding parts throughout the several views of the drawings.

DESCRIPTION OF THE PREFERRED EMBODIMENTS

Referring first to FIGS. 1 to 3, a membrane cartridge 20 embodying this invention comprises a cylindrical body 22 at the axis of which is a permeate collection tube 24 that protrudes from the left hand end of the body 22 and has a closed end 26 that is about flush with the flat right hand end of the body. The cartridge body 22 is assembled from one or more laminate or composite leaves, e.g., two leaves 28, 30 are shown in FIG. 2, each comprising a permeate transfer sheet 32, a membrane sheet 34 folded-over or glued to the permeate transfer sheet and a porous grid sheet 36 which carries feed liquid to the membrane sheet area. The leaves are spirally wound around the permeate collector tube 24, and all permeate reaching the permeate transfer sheet exits through holes 38 in the permeate collection tube 24 leading to the interior thereof. The membrane cartridge 20 is constructed so that the porous grid sheet of leaf 28 has an extension 40 past the membrane sheet 34 of leaf 28 of sufficient length to encompass the circumference of cartridge 20. The remaining leaf or leaves 30 (if any) all have their membrane sheets terminate only slightly short of their porous grid sheet. When the assembly of leaves is spirally wound around the permeate collection tube 24 each membrane sheet is completely covered by porous grid material extension 40 on the outer portion of the membrane cartridge, as illustrated in FIG. 1. The spirally wound cartridge assembly thus has its outer surface entirely composed of porous grid sheeting, as also seen in the sectional view of FIG. 3.

At this general stage of fabrication, a conventional membrane cartridge would be finished by wrapping a permanent layer of impervious self-adhesive tape, or the like, tightly around the exterior of the spirally wound body, however, the membrane cartridge 20 is placed in its pressure-resistant container without any permanent wrapping or winding over the outer layer of porous grid sheet material. For protection during shipping however, a removable, loose, protective temporary cover or sheet 42 of, for example, polyethylene film, is slipped over or wrapped around the membrane cartridge 20 and temporarily secured thereto, (see FIG. 4) by one or more removable circumferential restraining bands 44, e.g., adhesive tape. The bands 44 hold the cover 42 in place over cartridge 20 and prevent the unwinding of the leaves of the membrane cartridge during transport and storage. The removable cover 42 is disposed directly over the outer grid surface of membrane cartridge body 22, which itself has no permanent wrapping.

Before the membrane cartridge 20 is placed inside a pressure-resistant container 46, as shown in FIG. 5, the temporary bands 44 and the protective cover 42 are removed so that the membrane cartridge 20 then has no covering over its porous grid sheet outer surface. To insert the membrane cartridge 20 into the pressure-resistant container 46, the membrane cartridge 20 is grasped, as by the hands as shown in FIG. 5, so that the outer layer of porous grid sheet extension 40 is maintained in tightly wound relationship about the rest of the membrane cartridge body 22. The flat end of the membrane cartridge 20 is inserted into the mouth of pressure-resistant container 46 using a combined longitudinal and rotary motion that tends to more tightly wind the cartridge leaves, as illustrated in FIG. 5 by the direction arrow. Longitudinal and rotary motion is continued until the cartridge 20 is fully seated inside the pressure-resistant container 46 as shown in FIG. 6.

FIGS. 6 and 7 show membrane cartridge 20 in place in its pressure-resistant container 46 which is provided with one integral end 48 pierced by a threaded feed liquid entry pipe 50. Spacers 52 may be provided to assure the cartridge is spaced from the end to create an entry plenum 54. The other end of the container is closed by a removable plate 56 that seats against a shoulder 58 and is held in position by snap ring 60. Permeate collection tube 24 passes through an opening in plate 56, being sealed thereto to an "O" ring 62. A brine or concentrate outlet 64 is threaded through the sidewall of the container to provide for controlled brine outflow from an exit plenum 66 created by the shoulder 58.

The FIG. 7 cross-sectional view shows the surface contact between the outer surface of membrane cartridge 20, formed by porous grid sheet extension 40, and the inner surface 68 of the container 46. The spring back tendency of the membrane and other elements of the leaves to unwind maintains compressive, direct surface contact between the outer porous grid material surface of membrane cartridge 20 and the inner surface 68 of the pressure-resistant container 46.

An alternate embodiment of the membrane cartridge is generally indicated by reference character 20A in FIG. 8. Components of cartridge 20A corresponding to components of cartridge 20 are designated by the reference numeral applied to the cartridge 20 component with the addition of the suffix "A". A soluble, temporary, outer wrapping or cover is placed around the cylindrical outer surface of a body 22A. Otherwise the cartridge 20A includes spirally wound leaves and a projecting permeate collection tube 24A, all as previously described. Around the outer surface of the porous grid-material 36A of cartridge 20A is a tightly wound wrapping or cover 70 of soluble material, such as polyvinyl alcohol film. The wrapping material 70 is selected for its solubility in the feed liquid to be treated and other water-soluble or suitably degradable materials, such as gelatin-based films are also considered suitable for applications in which an aqueous liquid is employed as the feed liquid.

Membrane cartridge 20A is axially inserted in a similar pressure-resistant container with the soluble wrapping 70 in place. However, in contrast to a conventional cartridge, when feed liquid is supplied through the entry pipe of the container in which the cartridge 20A has been placed, the soluble wrapping 70 begins to quickly dissolve and is carried out the brine exit leaving no surrounding wrapping. The element leaves of the cartridge 20A slightly unwind, as previously described, to place the radially outward surface of the porous grid material 36A in direct, overall contact with the interior surface of the pressure-resistant container to produce the same arrangement as seen in FIGS. 6 and 7.

A number of advantages result from employment of the combination of hereinbefore-described semipermeable membrane cartridges and a pressure-resistant container. There is substantially improved cleaning capability because the outer surface of the membrane cartridge lies directly against the inner surface of this pressure container and eliminates any "dead space" in which stagnant feed solution may collect and resist total removal even with repeated back-washing and treatment with bactericide. Because the outer surface of the cartridge is composed of porous grid material, instead of the impervious adhesive tape wrapping used in the prior art, complete flow-through is provided in this area, so that feed liquid circulation is obtained not only through the body of the cartridge but also around this outer surface. This adjacent woven porous grid material produces substantial turbulence in the flowing liquid to provide efficient scouring action along the interior wall of the container.

The membrane cartridge of FIGS. 1-7 requires no permanent outer wrapping of self-adhesive tape. Only a simple, loose plastic cover, suitably secured at spaced intervals, is used to protect the membrane cartridge during shipping and to prevent unwinding and possible damage to the leaves. The cover is potentially reusable and less expensive than the heavy self-adhesive plastic tape wrapping tightly applied over the entire membrane cartridge surface of prior art cartridges.

The combination of membrane cartridge and pressure-resistant container of this invention is equally efficient regardless of the axial flow direction of the feed liquid. Thus, reversal of feed liquid flow provides an effective backwash effect; however, the cartridge-container combination of this invention may also be operated to provide long or short alternating cycles in opposite directions. Periodically introducing feed liquid into opposite ends of the cartridge results in more even exposure of membrane surfaces to incoming feed. Under conditions in which the membranes may tend to become clogged or otherwise adversely affected by solids or other aspects of the feed liquid, the deleterious effect will generally be more evident at the end of the cartridge into which the feed liquid is introduced. The reversible flow cartridge of this invention provides the opportunity to substantially increase membrane operating life before shutdown, removal and replacement of cartridges is required. Both the spiral wound membrane cartridges 20 and 20A should be carefully sized to snugly fit into its pressure-resistant container. The diameter of the membrane cartridge should be just small enough so that it can be inserted into the pressure-resistant container, preferably employing the method described herein. Too loose a fit will result in ineffective utilization of the interior volume and possibly blow-by or bypass flow between the cartridge outer surface and the inner surface of the container. The cartridge 20 should be under some wind-up tension to reduce its diameter to facilitate insertion without damage. Then, when in place, the leaf or leaves unwind slightly so that the outer surface is in direct contact with the inner surface of the container, and preferably some slight radially outward force remains from the inherent tendency of the materials of the leaves to return to their unwound configuration.

After the membrane cartridge has been in use in its pressure-resistant container for a period of time, it may, or will, be necessary to remove it for out-of-site cleaning or replacement. This can ordinarily be accomplished by a direct outward pull on the cartridge which ordinarily can thus be removed without damage. Some relaxation of the spring effect of the cartridge spiral windings, due to some degree of permanent set, may occur, which will assist in removal. However, if a membrane cartridge is tightly held in its container, it may generally be easily removed by employing the same combined rotational and longitudinal motion used for insertion.

In operation, the membrane cartridge 20 will be installed in a pressure-resistant container 46, as seen in FIG. 6. A source of pressurized feed liquid to be treated is connected in a conventional manner to inlet pipe 50, and concentrate will be released through the side outlet 64 at a pressure that is usually controlled by a conventional device, such as a pressure control valve (not shown). Permeate is recovered from tube 24 for whatever useful purpose the apparatus is employed.

Unlike the prior art membrane cartridges having porous grid material in direct contact with the inner surface of the container, the cartridge of the present invention does not require a separate sleeve or sock of the porous grid material which requires additional assembly steps. Furthermore, unlike prior art cartridges which have a plurality of leaves each having an extension of porous grid material which together encompass the cartridge body, cartridge 20 has only a single free end so that the porous grid extension is in intimate, continuous contact with the inner container surface except along a single line at the free end of the extension 40. Experience has shown that an outer wrap formed by a single leaf extension is more resistant to movement caused by the feed liquid flow stream. Also field assembly of the cartridge 20 requires only one precise cutting—that of porous grid material extension 40.

Extension 40 is of sufficient length to encompass the circumference of the cartridge when disposed inside container 46 against surface 68. Preferably, the extension is long enough to be rolled around the cartridge body one and one-half to two times.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. The combination of a spiral wound membrane cartridge and a pressure-resistant container for receiving said cartridge, said cartridge including a permeate collection tube with a spiral winding of a plurality of leaves each of which is a laminate of a semipermeable membrane sheet, a permeate transfer sheet and a porous grid sheet, only one of said leaves having an extension of said porous grid sheet of sufficient length to encompass the circumference of said cartridge whereby upon insertion of said cartridge into said container and release of said cartridge, said cartridge will undergo slight unwinding with the extension being in intimate, continuous contact with the interior surface of said container except along a single line at the free end of said extension, said container including a cylinder having a closed end pierced by a liquid entry pipe with a spacer disposed adjacent said closed end to limit the extent of insertion of said cartridge to create an entry plenum, said cylinder having an open end spaced from said closed end with an annular inner groove formed at said open end partially defined by a shoulder, said container further comprising a removable plate seating against said shoulder and held in position by a snap ring, said cartridge being spaced from said shoulder to form an exit plenum, said permeate collection tube extending through a central hole in said plate and being sealed to said plate by means of an "o" ring.

2. The combination as set forth in claim 1 further comprising:

a tubular surrounding temporary cover on the outer surface of said cartridge, which outer surface is constituted by said porous grid material, said cover being tightly wound around the cartridge and being formed of material which is soluble in the feed solution intended to be treated by said cartridge.

* * * * *